S. R. EWING.
PORTABLE HAY RACK.
APPLICATION FILED DEC. 12, 1914.
1,141,112.
Patented June 1, 1915.
2 SHEETS—SHEET 2.
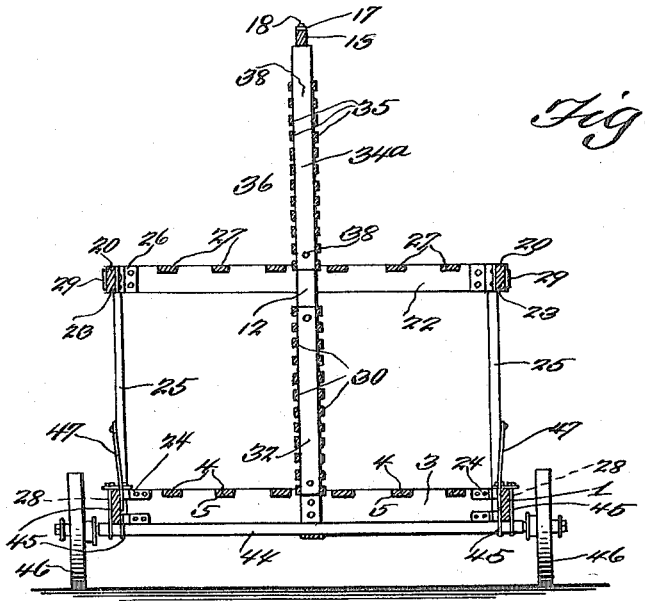
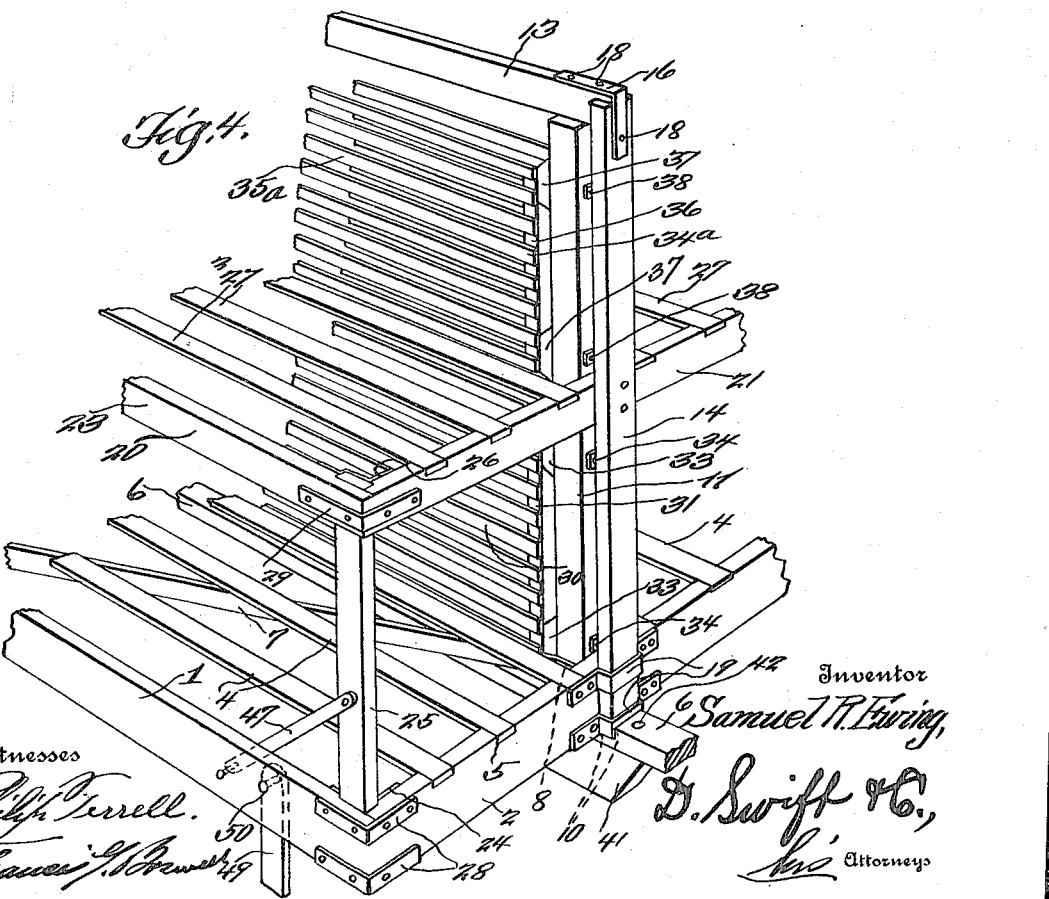

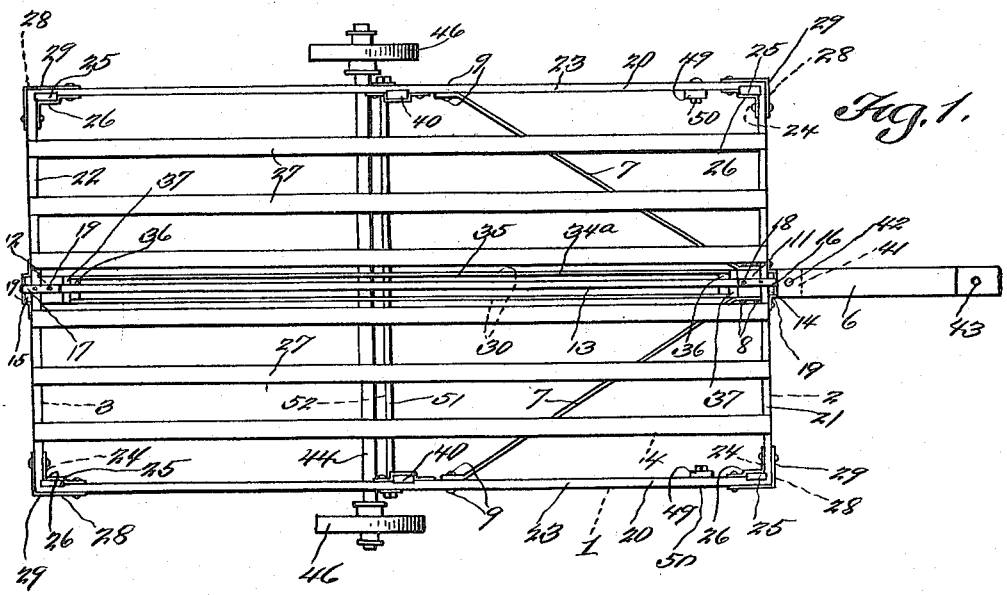

UNITED STATES PATENT OFFICE.

SAMUEL R. EWING, OF OWENSBORO, KENTUCKY.

PORTABLE HAY-RACK.

1,141,112.  Specification of Letters Patent.  Patented June 1, 1915.

Application filed December 12, 1914. Serial No. 876,815.

*To all whom it may concern:*

Be it known that I, SAMUEL R. EWING, a citizen of the United States, residing at Owensboro, in the county of Daviess and State of Kentucky, have invented a new and useful Portable Hay-Rack; and I do hereby declare the following to be a full, clear, and exact description of the invention, such as will enable others skilled in the art to which it appertains to make and use the same.

This invention relates to a new and useful portable hay rack.

As an object of the invention, it is the aim to provide an improved rack frame having a central division and provided with upper and lower tiers, the upper most one of which being disposed substantially midway of the height of the central partition, thereby providing an improved rack, on which green hay may be placed, and allowed to cure by exposing it to the air. The central partition and the upper and lower tiers act to form air chambers centrally through the hay or the like, so that the interior thereof may become well cured by the passage or air. This improved rack is mounted upon supporting wheels, thereby rendering the same portable from place to place. However, the rack may be supported stationary if desired.

The details of construction may be subjected to alterations falling within the scope of what is claimed.

The invention comprises further features and combination of parts as hereinafter set forth shown in the drawings and claimed.

In the drawings: Figure 1 is a plan view of the improved hay rack constructed in accordance with the invention. Fig. 2 is a view in side elevation. Fig. 3 is a sectional view on line 3—3 of Fig. 2. Fig. 4 is an enlarged detail perspective view of the forward portion of the hay rack.

Referring more especially to the drawings 1 designates the base frame of the rack comprising the forward and rear end bars 2 and 3, which are connected by the longitudinal bars 4. The longitudinal bars 4 are mortised into the end bars as shown at 5. The base frame has securd to it and arranged centrally, the tongue bar 6, and the straps 7 have their forward ends secured as at 8 to an upright, while the diverging ends are secured at 9 to the longitudinal sides of the said base frame. The forward end bar 2 is recessed or mortised at 10 to receive the tongue bar 6, thereby reinforcing the tongue bar. Rising upwardly from the forward portion and the rear-portion of the base frame are forward and rear standards 11 and 12, and connecting their upper ends is a beam 13. Bars 14 and 15 are arranged adjacent to but spaced apart from the standards 11 and 12. The upper ends of the bars 14 and 15 are connected to the beam 13 by the angle irons or plates 16 and 17, which are secured at 18. Arched straps 19, which secure the lower ends of the bars 14 and 15 in place, are provided as shown. Connected to the standards 11 and 12 is a frame 20, which is spaced apart from the base frame.

The frame 20 comprises the end bars 21 and 22, to which are secured the elongated bars 23. Rising from the base frame 1 and secured in the corners of said frame by angular straps 24 are standards 25 the upper ends of which are secured in the corners adjacent side bars 23 and the end bars 21, by means of the angular metal straps 26. Slats 27 connect the end bars 21 and 22. Angular metal straps 28 and 29 are secured upon the outer portions of the corners of the base and super-imposed frames 1 and 20, in order to reinforce the structure. Centrally below the frame 20, and between the standards 11 and 12 is a frame of longitudinal slats 30, which slats are secured to the standards 31 and 32. The standards 31 and 32 are held spaced apart from the standards 11 and 12 by the spacing blocks 33, there being bolts 34 passing through the blocks, through the standards 31 and 32 and the standards 11 and 12, thereby insuring rigidity and strength. A frame 34$^a$ composed of slats 35 and the standards 36, is arranged centrally and rising from the frame 20; the standards 36 are spaced apart from the standards 11 and 12 by the blocks 37. Bolts 38 pass through the standards 36, 11 and 12 and said blocks 37 to secure the parts in place. It will be noted, upon an observation of the drawings that there is a space between the upper most slat of the lower slats and the lowermost slat of the upper frame 34$^a$ in order to afford a draft through the hay which may be piled upon the base frame and the frame 20, thereby curing or seasoning the hay. The upper and lower frames also divide the hay centrally, so as to insure an air draft in order to cure the hay. Additional standards 40 are secured to the side bars of the base frame 1 and to the side bars 23 of the super-imposed frame 20. A rest in the form of a block shown at 41 is secured at 42 to the tongue, by means of bolts. This rest block is designed to take the strain off the tongue, when the tongue is detached from forward supporting wheels (not shown). In other words when the tongue is disconnected at 43 from said forward supporting wheel (not shown), the said hay rack is tilted downwardly, in which case the rest block 41 engages the ground. The base frame 1 has an axle 44 secured to it by the U-shaped bolts 45 and on the axle are supporting wheels 46. Said axle and the wheels are so disposed relative to the forward and rear ends of the base frame 1 as to permit the base frame to tilt downwardly. The standards 25 are braced relative to the base frame by the bars or straps 47. Drag legs 49 are pivoted at 50 to the base frame 1. These drag legs are used to support the rack, when the tongue is disconnected from said forward supporting wheels. The base and super-imposed frames 1 and 20 are provided with transverse brace rods 51 and 52. The hay is deposited on the base frame and the frame 20, and as before stated, the slats 30 and 35 separate the hay, and the air is allowed to pass through the space between the upper and lower slats to cure the hay.

The invention having been set forth what is claimed as new and useful is:—

1. A hay rack comprising base and super-imposed frames spaced apart, forward and rear standards to support the super-imposed frames, reinforcing means for the standards, longitudinal frames comprising a plurality of slats arranged centrally, one above the base frame, and one above the super-imposed frame, and means for securing the slatted frames to the said standard.

2. A hay rack comprising a base frame, forward and rear standards rising from the base frame and centrally thereof, a beam connecting the upper ends of said standards, vertical bars bracing the standards and connected to the said beam, a second frame spaced apart above the base frame and connected to the standards to form upper and lower compartments, standards connected to and bracing the corners and side bars of the base and second frame, slatted elongated partitions dividing the upper and lower compartments longitudinally, one partition being arranged above the other and spaced apart therefrom to form an air channel, spacing blocks between the partitions and said standards, ends of the forward and rear supporting wheels for the whole structure of the hay rack, and a tongue bar having a rest block connected to the rack.

In testimony whereof I have signed my name to this specification in the presence of two subscribing witnesses.

SAMUEL R. EWING.

Witnesses:
 GROVER C. HILL,
 J. M. MATTINGLY.

Copies of this patent may be obtained for five cents each, by addressing the "Commissioner of Patents, Washington, D. C."